United States Patent [19]

Carroll

[11] Patent Number: 5,734,440
[45] Date of Patent: Mar. 31, 1998

[54] WHITE CLIP CIRCUIT

[75] Inventor: Sarah Joanne Carroll, Lancashire, PR5 2BD, United Kingdom

[73] Assignee: Plessey Semiconductors Limited, United Kingdom

[21] Appl. No.: 512,143

[22] Filed: Aug. 7, 1995

[30] Foreign Application Priority Data

Aug. 30, 1994 [GB] United Kingdom .................... 9417414
Jun. 13, 1995 [GB] United Kingdom .................... 9512019

[51] Int. Cl.[6] .............................. H04N 5/52; H04N 5/14
[52] U.S. Cl. ........................... 348/678; 348/707; 348/690
[58] Field of Search .................................. 348/678, 707, 348/690; 333/216; H04N 5/52, 5/14

[56] References Cited

U.S. PATENT DOCUMENTS

| 3,557,305 | 1/1971 | Dann . | |
| 3,560,645 | 2/1971 | Wallace, Jr. | 348/690 |
| 3,569,620 | 3/1971 | Baun | 348/690 |
| 3,947,631 | 3/1976 | Rhee et al. . | |
| 3,965,371 | 6/1976 | Sato et al. . | |
| 3,980,815 | 9/1976 | Kaneko . | |
| 4,056,688 | 11/1977 | Stiefel . | |
| 5,304,946 | 4/1994 | Sano | 348/707 |

FOREIGN PATENT DOCUMENTS

| 0 135 809 A | 4/1985 | European Pat. Off. . |
| 2 604 583 A | 4/1988 | France . |
| 1 191 096 | 5/1970 | United Kingdom . |
| 2 292 861 | 3/1996 | United Kingdom . |

OTHER PUBLICATIONS

IEEE Transactions on Consumer Electronics, vol. 30, No. 3, Aug. 30, 1984, New York, pp. 312–318, SP002004343, J. Fenk, et al., "*VHF/UHF Modulator IC*".

*Primary Examiner*—Sherrie Hsia
*Attorney, Agent, or Firm*—Kirschstein, et al.

[57] ABSTRACT

A white clip circuit, formed as an integrated circuit, includes a negative impedance converter which in use is operative to increase the sensitivity of an inverting long-tailed pair of transistors adapted to invert the signals and feed them back to the input in order to control the clip level and to enable it to be effective at a relatively low level.

3 Claims, 3 Drawing Sheets

५,७३४,४४०

WHITE CLIP CIRCUIT

BACKGROUND OF THE INVENTION

The present invention relates to semiconductor circuits and more particularly to a semiconductor for incorporation in a video modulator.

The invention has particular application in a multi-standard video modulator which up-converts a baseband video signal with separate audio frequency input onto a VHF or UHF carrier. The rf signals are provided with negative or positive video modulation and an amplitude or frequency modulated sound sub-carrier to satisfy both PAL and SECAM applications.

In such a video modulator it is normal to provide some means for controlling or limiting the amplitude of the baseband video. In this connection it is known to employ individually an automatic gain control circuit or a so-called white clip circuit.

SUMMARY OF THE INVENTION

According to one aspect of the present invention a white clip circuit which is formed as an integrated circuit or chip includes a negative impedance converter which in use is operative to increase the sensitivity of an inverting long-tailed pair of transistors adapted to invert the signals and feed them back to the input in order to control the clip level and to enable it to be effective at a relatively low level.

According to another aspect of the present invention a video modulator semiconductor integrated circuit is provided with both an automatic gain control and a white clip circuit and means on the integrated circuit or chip to enable either the automatic gain control circuit or the white clip circuit to be selectively switched into the overall circuit in order to prevent over modulation.

BRIEF DESCRIPTION OF THE DRAWINGS

How the invention may be carried out will now be described by way of example only and with reference to the accompanying drawings in which.

DETAILED DESCRIPTION OF THE PREFERRED EMBODIMENT

FIG. 1

Figure 1:
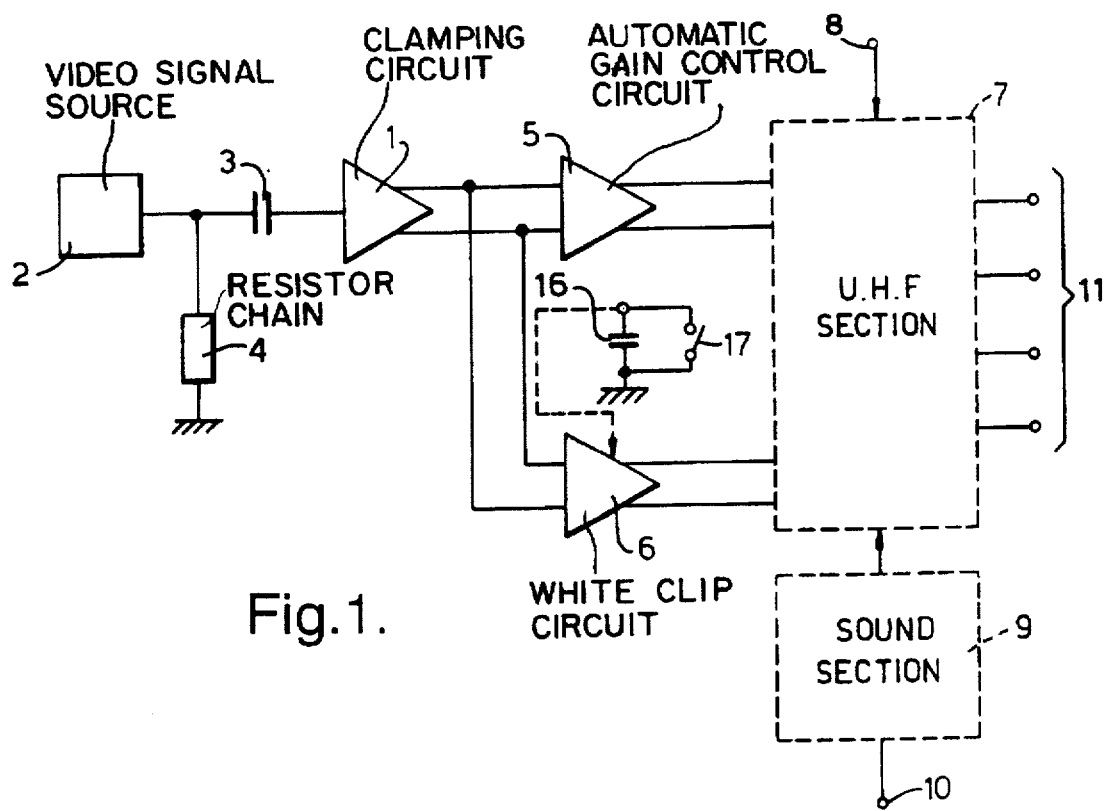
FIG. 1 is a block diagram of a video modulator to which the present invention can be applied.

This figure shows diagrammatically in block form a video modulator into which a sync tip clamp circuit according to the present invention may be incorporated, although the present invention is not limited to this particular application.

The clamp circuit is indicated at 1 a video signal 2 being a.c. coupled into the input of the clamp circuit 1 through a capacitor 3 which typically could have a value of 680 nF depending upon the video specifications. The clamp circuit is the subject of our copending United Kingdom Patent Application GB 2 292 861 A, corresponding to U.S. patent application Ser. No. 08/512,191, now abandoned.

The clamping circuit 1 is only active when the video signal 2 is negative, i.e. throughout the synchronisation pass. During this time, current from the input transistor (not shown) is fed into the capacitor 3 thus charging it up and clamping the sync tip of the video to a specific level which is defined by a resistor chain 4.

The output of the clamp circuit 1 is fed to an automatic gain control circuit 5 and also to a white clip circuit 6, the relationship between the automatic gain control circuit 5 and the white clip circuit 6 and the construction of the latter is described later with reference to FIG. 2.

The output from the automatic gain control 5 and the white clip circuit 6 feeds into a UHF section which is illustrated diagrammatically at 7. The composition of the UHF section 7 will not be described as it is not relevant to the present invention.

The UHF section 7 has a sub-carrier input 8 and a further input from a sound section diagrammatically illustrated at 9. Again the details of the sound section will not be described as they form no part of the present invention. The sound section 9 has an audio input 10.

The UHF section 7 has outputs 11.

FIG. 2

Figure 2:
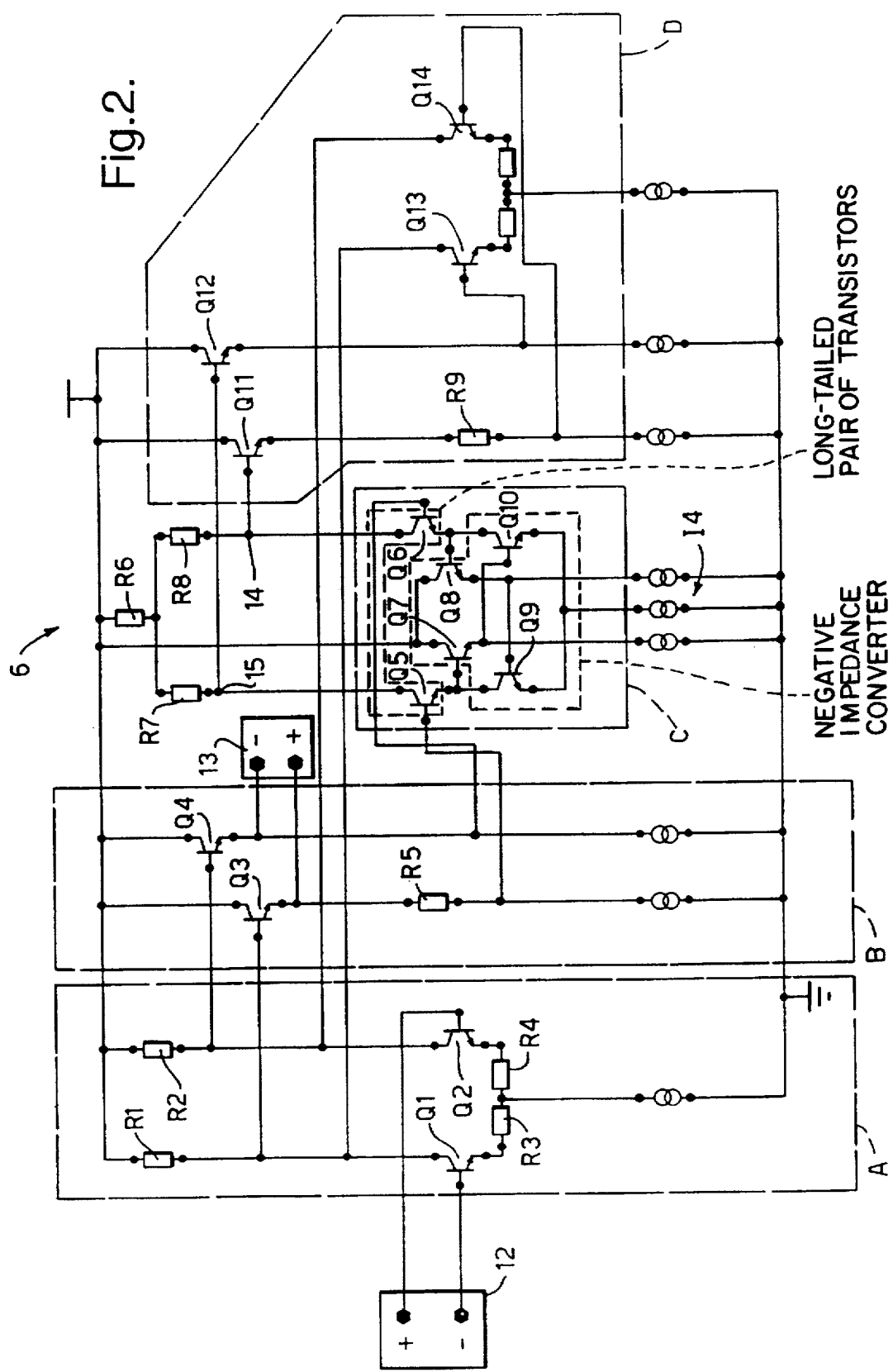
FIG. 2 is a circuit diagram of one embodiment of the present invention.

The purpose of the white clip circuit arrangement shown in FIG. 2 is to give protection against over modulation. As shown in FIG. 2 the input to the white clip circuit 6 is connected to the output of the clamp circuit 1 through which the incoming video waveform passes and is thus sync-tip clamped at a fixed d.c. level.

Input signal spikes enter the video modulator and can cause over modulation of the RF carrier. The function of the white clip circuit 6 is to detect any such spikes that rise more than a certain percentage above the peak white level and then clip them off at a specified point.

The circuit shown in FIG. 2 consists essentially of four sections A, B, C and D as indicated. Section A is an amplifier to adjust the video input to the clipping circuit for use with 0.5 volt peak to peak and 1 volt peak to peak input video signals. For example where the terminal input value is 1 volt the amplifier would be set to a gain of 1 and where the input voltage is 0.5 volt the gain would be set at 2. The clamp circuit is designed to cope with input voltages in the range 0.5 to 1.5 volts.

The purpose of the second section B is to set the clipping point, by defining a dc offset.

The purpose of the section C is to act as a comparator and this pan of the circuit forms the key area of the present invention.

The purpose of the section D is to detect when the white level goes above the clipping point.

The operation of the circuit arrangement shown in FIG. 2 will now be described in more detail.

The first stage or section A of the circuit comprises resistors R1, R2, R3, R4 and transistors Q1 and Q2. As indicated earlier this arrangement functions as a high linearity amplifier whose gain is adjustable by changing the value of the load resistors. This adjustment enables the circuit to be used for both the 0.5 volt commonly used by the Japanese and the 1.0 volt video inputs used by other manufacturers.

Figure 3A:
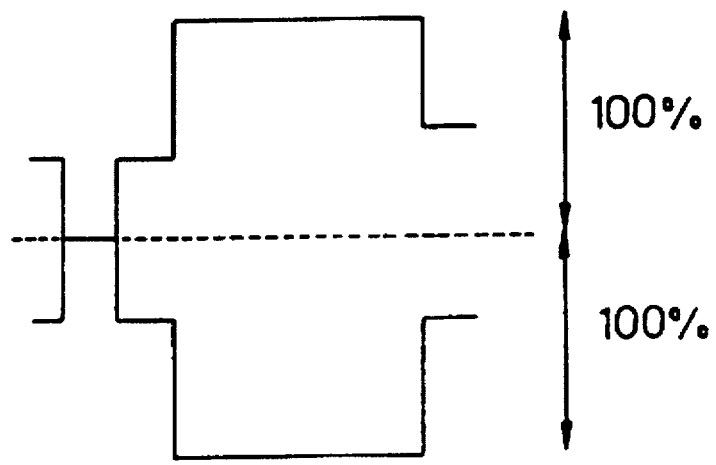
FIGS. 3a and 3b illustrate the differential video signals before and after a level shift.
Figure 3B:
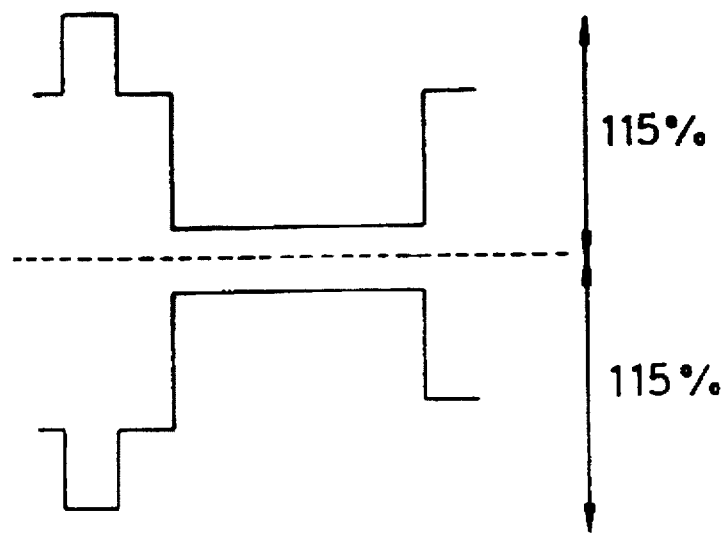

Section B of the circuit sets the clipping point. This is done by the resistor R5 level shifting the positive differential signal down by twice the clip point as shown in FIGS. 3a and 3b.

Usually the clip point is set at 115% so that the chroma above the peak white level is not clipped but any larger spikes will be. Thus the level shift in this case will be 230%, which for a 100 mv sync tip to white single sided signal corresponds to 230 mv.

However the clip point can be easily varied by changing the value of the resistor R5.

Q3 and Q4 are used as voltage buffers (emitter followers) which apply a DC offset to the +ve going video signal by means of R5.

With a correctly proportioned video signal with no spiking present the DC offset introduced by R5 will always present a lower voltage to Q5 than Q6. In this state the sensitive comparator is switched with virtually all the current "I4" flowing through R8.

The output to the clip circuit is indicated at 13.

Any excursion above the clip point will cause the peak white level of the two signals to overlap. This will then toggle the fast comparator of section C which comprises the transistor network Q5, Q6, Q7, Q8, Q9 and Q10. Q7 and Q8 being emitter follower buffers to improve the toggle time further.

The outputs from the comparator section C are indicated at 14 and 15.

It would be possible to provide a comparator which comprises simply long-tailed pairs but these alone would not provide the required sensitivity with the result that clipping would occur at undesirable points.

Therefore, according to the present invention, the voltage required to switch the comparator is reduced by utilising a negative impedance converter (NIC) topology with two emitter followers Q7 and Q8.

This results in the response time of the comparator being reduced thus leading to a more accurately defined clip point. This in turn means that the clip point can be set at a lower level, typically 115% instead of say 130%, than would be the case where the clip point has to be set at a high enough level to ensure that variations in the clip point do not cause the chroma to also be clipped.

When the comparator is switched all the current flows through the resistors R6 and R7. At this point one side of the differential signal is I4*R7 volts below the other.

The excursion above 115% by each differential signal is then present at the outputs 14, 15 of the comparator which connect to transistors Q11 and Q12 respectively.

A resistor R9 is provided to level shift the other side of the differential signal down to a voltage equal to I4*R7 thus resulting in the d.c. voltage on the bases of transistors Q13 and Q14 being equal. This is to ensure that there is no d.c. offset because its presence would be fed back to the input and cause second harmonics.

The function of transistors Q13 and Q14 is to invert the detected spikes and feed them back to the inputs so that the initial spike which has been detected above the clip point is cancelled by a pulse which is equal in magnitude but opposite in sense.

If there are in fact no spikes on the input video waveform then no clipping will occur and the signal will pass straight through the white clip circuit represented by the sections A and B.

The relationship between the automatic gain control 5 and the clip circuit 6 as shown in FIG. 1 will now be described.

The video modulator arrangement shown in FIG. 1 is fabricated as an integrated circuit on a single chip. It is designed to be used with a variety of video inputs (as indicated earlier in this specification) and to meet differing customer requirements.

In particular the automatic gain control 5 and the white clip circuit 6 are provided as alternatives for preventing over modulation. In other words the white clip circuit 6 is switched in when the automatic gain control 5 is switched out. This is achieved by grounding an off-chip capacitor 16 by means of an off-chip switch 17.

I claim:

1. A white clip circuit which is formed as an integrated circuit and which is operable at a predetermined low clip level, comprising:

a) an input stage having a video signal input, a feedback input and an output;

b) a comparator stage having a sensitivity and including
  i) a long-tailed pair of transistors, the transistors having base, collector and emitter electrodes,
  ii) a negative impedance convertor for determining the sensitivity of the comparator stage, and
  iii) means connecting said negative impedance convertor to the emitter electrodes of the long-tailed pair of transistors;

c) a feedback stage having an input and an output;

d) circuit means connecting the output of said input stage to the base electrodes of the long-tailed pair of transistors of the comparator stage;

e) means connecting the collector electrodes of the long-tailed pair of transistors of the comparator stage to the input of the feedback stage; and f) means connecting the output of the feedback stage to the feedback input of the input stage.

2. The white clip circuit as claimed in claim 1, wherein the input stage comprises an amplifier circuit, wherein the circuit means comprises means for determining said clip level, and wherein the feedback stage comprises means responsive to a white level signal above said predetermined clip level to provide a negative feedback signal to the amplifier circuit.

3. A video modulator arrangement formed as an integrated circuit, comprising:

a) an automatic gain control circuit having a video signal input, an enable input and an output;

b) a white clip circuit having an output;

c) a modulator circuit;

d) means connecting the respective outputs of the automatic gain control circuit and the white clip circuit to the modulator circuit; and e) switch means operable to enable selectively one of the automatic gain control circuit and the white clip circuit.

* * * * *